(12) United States Patent
Fabijancic et al.

(10) Patent No.: US 11,269,822 B2
(45) Date of Patent: Mar. 8, 2022

(54) GENERATION OF AUTOMATED DATA MIGRATION MODEL

(71) Applicant: SAP SE, Walldorf (DE)

(72) Inventors: Toni Fabijancic, Eppelheim (DE); Sebastian Mietke, Wiesloch (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 15/728,226

(22) Filed: Oct. 9, 2017

(65) Prior Publication Data

US 2019/0108223 A1 Apr. 11, 2019

(51) Int. Cl.
*G06F 16/21* (2019.01)
*G06F 8/30* (2018.01)

(52) U.S. Cl.
CPC .............. *G06F 16/214* (2019.01); *G06F 8/30* (2013.01); *G06F 16/212* (2019.01)

(58) Field of Classification Search
CPC ......... G06F 16/214; G06F 8/30; G06F 16/212
USPC ........................................................ 707/609
See application file for complete search history.

(56) References Cited

U.S. PATENT DOCUMENTS

| | | | | |
|---|---|---|---|---|
| 7,664,795 B2* | 2/2010 | Balin | ................. | G06F 16/214 707/661 |
| 8,688,632 B2* | 4/2014 | Niki | ................. | G06F 16/185 707/610 |
| 9,201,606 B1* | 12/2015 | Taylor | ................. | G06F 3/0661 |
| 10,073,869 B2* | 9/2018 | Singh | ................. | G06F 16/214 |
| 10,324,947 B2* | 6/2019 | Dey | ................. | G06N 20/00 |
| 2005/0138606 A1* | 6/2005 | Basu | ................. | G06F 8/30 717/136 |
| 2005/0149537 A1* | 7/2005 | Balin | ................. | G06F 16/214 |
| 2007/0299975 A1* | 12/2007 | Daschakowsky | ..... | G06F 16/214 709/228 |
| 2008/0140692 A1* | 6/2008 | Gehring | ................. | G06F 16/254 |
| 2009/0077014 A1* | 3/2009 | Zachariah | ................. | G06F 16/214 |
| 2012/0078974 A1* | 3/2012 | Meijer | ................. | G06F 16/288 707/803 |
| 2012/0124081 A1* | 5/2012 | Ebrahimi | ................. | G06F 16/214 707/769 |
| 2012/0265726 A1* | 10/2012 | Padmanabhan | ........ | G06F 16/214 707/602 |

(Continued)

*Primary Examiner* — Pierre M Vital
*Assistant Examiner* — Andrew N Ho
(74) *Attorney, Agent, or Firm* — Buckley, Maschoff & Talwalkar LLC

(57) ABSTRACT

Technologies are provided for capturing information during a data migration and to use the captured information to generate data migration artefacts that can be used in subsequent data migrations. Artificial intelligence techniques can be used to analyze the captured data migration information and to generate a data migration model that can be used to create the data migration artefacts. Changes made to the data migration artefacts can be tracked and used to train the data migration model. Additionally or alternatively, during execution of the subsequent data migration, additional data migration information can be captured and used to train the data migration model. The captured data migration activity can include data access operations such as data transactions, system log activity, and/or source code for one or more data migration programs and/or scripts. Computer system version information can be detected and different migration artefacts can be created for different computer system versions.

19 Claims, 11 Drawing Sheets

(56) References Cited

U.S. PATENT DOCUMENTS

| | | | |
|---|---|---|---|
| 2013/0173546 A1* | 7/2013 | Cline | G06F 16/27 |
| | | | 707/638 |
| 2014/0019387 A1* | 1/2014 | Cao | G06F 16/119 |
| | | | 706/12 |
| 2014/0372346 A1* | 12/2014 | Phillipps | G06N 20/00 |
| | | | 706/12 |
| 2015/0019479 A1* | 1/2015 | Buehne | G06F 16/214 |
| | | | 707/609 |
| 2016/0155069 A1* | 6/2016 | Hoover | G06F 16/25 |
| | | | 706/12 |
| 2017/0132525 A1* | 5/2017 | Rozier | G06F 16/215 |
| 2017/0270154 A1* | 9/2017 | Stephens | G06F 16/211 |

* cited by examiner

GENERATION OF AUTOMATED DATA MIGRATION MODEL

BACKGROUND

Migrating data from one computer system to another can involve lengthy analysis and development. In scenarios where the two computer systems were not designed to share data, a data analyst may be required to study a data structure of one or both of the systems and to develop one or more programs for extracting data from one of the systems and storing it in the other system. In at least some cases, an understanding of the relationship between the data structures for the two computer systems only exists in the mind(s) of the data analyst(s) who performed the data migration. This can result in duplication of effort, since a different analyst working on a different migration project for two other computer systems may repeat all or part of the same analysis to learn the relationship between the computer system data structures.

Therefore, there is room for improvement in technologies related to data migration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system comprises a migration modeler configured to monitor data migration operations comprising a transfer of data from a first source system of a first type to a first destination system of a second type, and generate a migration model for migrating data from a system of the first type to a system of the second type based on the data migration operations. The system further comprises a migration automation manager configured to receive a request to create a data migration program for migrating data from a second source system to a second destination system, determine that the second source system is a system of the first type and that the second destination system is a system of the second type retrieve the generated migration model from the migration modeler, and generate a data migration program for migrating data from the second source system to the second destination system based on the migration model.

In another embodiment, a method comprises capturing data migration operations for a migration of data stored in a first source computer system to a first destination computer system; generating a data migration model using the captured data migration operations; and generating a migration strategy for a migration of data stored in a second source computer system to a second destination computer system based on the data migration model.

In another embodiment, one or more computer-readable media store instructions that, when executed by one or more processors, cause the one or more processors to perform operations, the operations comprising monitoring a migration of data from a first source system of a first type to a first destination system of a second type, wherein the monitoring comprises analyzing data transactions executed against the first source system to retrieve the data from the first source system and data transactions executed against the first destination system to store the data in the first destination system, analyzing system logs of the first source system and the first destination system, and analyzing migration project source code that is executed to perform the migration of the data from the first source system to the first destination system. The operations further comprise generating a data migration model for migrating data from a system of the first type to a system of the second type based on the analyzing of the data transactions, the system logs, and the migration project source code, generating a data migration program for migrating data from a second source system of the first type to a second destination system of the second type using the data migration model, and using the data migration program to migrate the data from the second source system of the first type to the second destination system of the second type.

As described herein, a variety of other features and advantages can be incorporated into the technologies as desired.

DETAILED DESCRIPTION

Example 1

Overview

Figure 1:
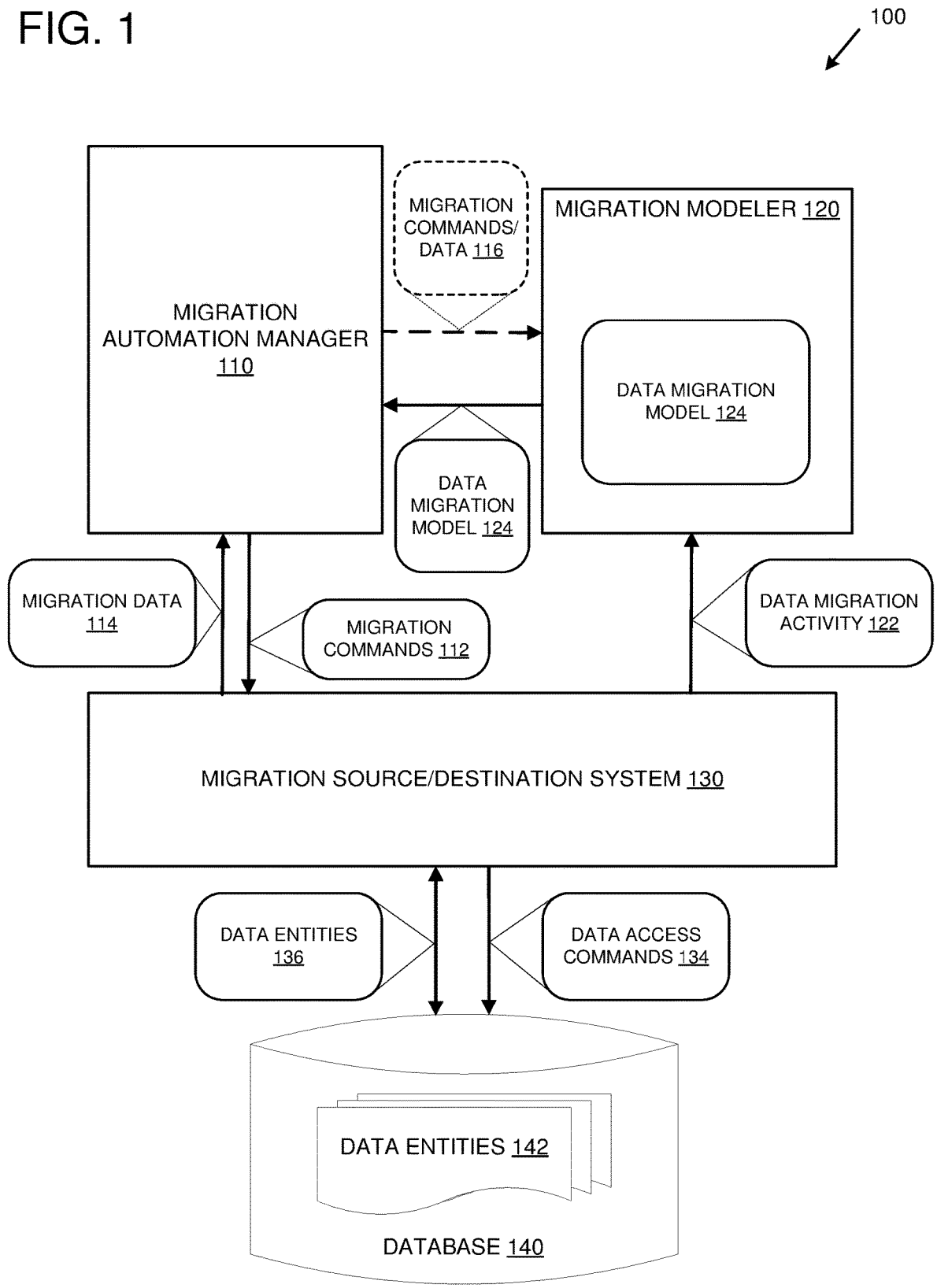
FIG. 1 is a system diagram depicting an example system for monitoring a data migration and generating a model for use in automating subsequent data migrations.

The description provided herein is directed to technologies for supporting data migration between computer systems.

Migrating data from one computer system to another computer system can involve up-front analysis to learn data models for the two computer systems and to develop a logical mapping between the two data models. However, when this analysis is performed by one or more analysts, the understanding of the data models and the mappings between them may only exist in the minds of the analysts. Even when scripts and programs are developed to perform all or part of the data migration, their use may often be predicated on an overall understanding of the different system data models that is not expressly documented. This can increase the time and expense required for data migration projects, as analysts working on a subsequent data migration often cannot benefit from the understanding of the system data models that is in the minds of the analysts who worked on a previous data migration. Even when scripts and/or programs have been developed to assist in data migration, differences between the computer systems involved in the previous data migration and the computer systems involved in the subsequent data migration may render the scripts and/or programs ineffective. For example, a newer version of a computer system may introduce changes to the computer system's data model which break assumptions embedded in the logic of one or more of the scripts and/or programs. In such situations, the previously developed scripts and/programs cannot be used without first understanding the differences between the previous and subsequent system data models and changing the scripts and/or programs to account for the differences.

Some previous attempts to automate data migration have attempted to completely automate the data mapping process by analyzing data structures for a source database and target database and generating mappings between the tables and fields in the data structures based on common table and field names. However, the differences in the data structures and naming conventions for different computer systems (especially complex system) can cause such techniques to yield less than useful results. Furthermore, in some cases a mapping between a source data entity and a target data entity is not possible without an intervening transformation of the data.

Various technologies described herein can be used to capture data migration activity during the execution of a data migration and to use the captured information to generate a data migration model that can be used in subsequent data migrations. The generated data migration model can be used to create automated migration artefacts (such as a data migration strategy, executable migration code, etc.) for use in a subsequent data migration. Changes to the automated migration artefacts can be tracked and used to train the generated data migration model. Additionally or alternatively, during execution of the subsequent data migration, additional data migration activity can be captured and used to train the generated data model. Thus, in at least some scenarios, the data migration model can be iteratively trained as subsequent data migrations are performed.

In one example, the captured data migration activity can include data access operations targeting a source computer system and/or a destination computer system during the migration of data from the source computer system to the destination computer system. System log activity for the source and/or destination computer system(s) can also be captured and analyzed. Additionally or alternatively, source code for one or more scripts and/or programs that are executed to perform all or part of the data migration can retrieved from a version control system and analyzed as part of the model generation process.

Example 2

Example Systems and Methods for Supporting System Migration

In any of the examples described herein, a system can be provided for generating a data migration model for system migration.

FIG. 1 is a system diagram depicting an example system 100 for monitoring a data migration and generating a model for use in subsequent data migrations. The example system 100 comprises a migration modeler 120 configured to monitor a computer system 130 that is participating in a data migration and to gather data migration activity 122 from the computer system 130. The computer system 130 can be a source system from which data is being extracted. Additionally or alternatively, the system 130 can be a destination system to which the extracted data is being written. In at least some embodiments, the migration modeler 120 can be configured to monitor both a source computer system and a destination computer system and to gather data migration activity from both systems.

The data migration activity 122 can comprise data access commands 134 that are transmitted by the observed computer system 130 to a database 140 to which the observed computer system is connected. Additionally or alternatively, the data migration activity 122 can comprise data entities 136 that are written to and/or retrieved from the observed computer system 130 as part of one or more migration operations. In at least some embodiments, the migration modeler 120 can be configured to monitor the database 140 directly. In a different or further embodiment, the migration modeler 120 can obtain data migration activity 122 via an application programming interface (API) of the observed computer system 130.

The data migration activity 122 can comprise system log activity for the observed computer system 130. For example, one or more logs can be monitored by the migration model 120 as data migration operations or performed that effect the observed computer system 130 and/or the database 140. In at least some embodiments, the migration modeler 120 can be configured to access one or more of the system logs via a file system of the observed computer system 130 where the logs are stored. Additionally or alternatively, the migration modeler 120 can receive log activity via a message exist up (such as via event notifications, streaming pipeline, etc.).

The data migration activity 122 can comprise migration commands 112 and/or migration data 114 that are transmitted to/receive from the observed computer system 130 as part of the data migration. For example, a data migration project comprising one or more executable programs can be used to orchestrate a data migration from the source computer system to a destination computer system (one of which can be the observed computer system 130). The migration modeler 120 can be configured to retrieve all or part of the migration project from a source control repository and to analyze the retrieved all or part of the migration project as part of the data migration model generation process.

In at least some cases, the migration model 120 can be configured to receive migration commands and/or migration data 116 from a migration automation manager 110. Additionally or alternatively, the migration modeler 120 can be configured to observe migration commands 112 and/or migration data 114 transmitted between the observed computer system 130 and the migration automation manager 110. The migration automation manager 110 can be configured to execute one or more of the executable programs that make up the migration project to migrate data to/from the observed computer system 130.

The migration modeler 120 is configured to analyze the gathered data migration activity 122 and to generate a data migration model 124. The analyzing can comprise identifying relevant data entities (e.g., data tables, etc.) of the observed computer system 130 and to correlate them to a known data model. For example, identities of the data entities can be analyzed to attempt to identify well known data entities and/or well-known data entity fields. A well-known data entity can be a data entity that has been identified by previous analysis and/or manual programming and correlated to one or more aspects of the data model. Where a given data entity and/or data entity field is not well known, various techniques can be used to determine an association between the data entity and/or data entity field and one or more aspects of the data model. For example, dictionaries and ontologies stored in an information repository of the migration modeler 120 can be used to determine semantic meanings of the identity of the data entity or data entity field name. The semantic meanings can then be correlated to semantic meanings of one or more aspects of the data model based on data migration activity observed and analyzed in each of the migration.

Additionally or alternatively, supervised and/or unsupervised machine learning techniques can be used to predict correlations between data entities and/or data entity fields and aspects of the data model. For example, classification and/or clustering algorithms can be used to predict associations between the data model and data entities and/or data entity fields of the observed computer system 130. The migration modeler 120 can be configured to repeat observation and analysis procedures for multiple migrations involving multiple observed computer systems and can learn a migration model. Feedback (e.g., in the form of subsequent modification and/or enhancement of the data migration model 124) can be used to train the data migration model 124, thereby improving the accuracy of the data migration model 124 for use in subsequent migrations. For example, various machine learning algorithms can be used to detect patterns in migration operations performed by one or more previous data migrations from systems of a first type to systems of a second type. A predicted migration program can be generated based on these detected patterns. Subsequent modifications to the generated migration program can be detected and use to reinforce and/or discount one or more decisions made by the various machine learning algorithms.

In at least some embodiments, the migration modeler 120 can be configured to determine a system type of the observed computer system 130. Determining the system type can comprise analyzing information about the observed computer system 130 (such as filenames, identities of data entities 142 stored in the database 140, interfaces, service endpoints, etc.) and determining that aspects of the analyzed information is similar to aspects of known computer systems associated with a given system type. If a system type for the observed computer system 130 can be determined, the generated data migration model 124 can be associated with the system type.

The migration automation manager 110 can be configured to use the data migration model 124 to automate all or part of the subsequent data migration. For example, migration automation manager 110 can be configured to receive a request to create a data migration program for migrating data from a source system to a destination system.

The migration automation manager 110 can retrieve the data migration model 124 from the migration modeler 120 and can generate a data migration program from migrating data from the source system to the destination system using the migration model 124. In an embodiment where the data migration model 124 is associated with a system type, the migration automation manager 110 can be configured to determine a system type for the source computer system and a system type for the destination computer system and to retrieve data migration model if one of the system types for the source computer system and destination computer system is the same as the system type associated with the data migration model 124. In at least some such embodiments, the data migration model 124 can be associated with a source system type and a destination system type. In such embodiments, the migration automation manager 110 can be configured to retrieve the data migration model 124 if the system type of the source system matches the source system type for the data migration model 124 and the system type for the destination system matches the destination system type for the data migration model 124.

The program for migrating data from the source system to the destination system can comprise a series of steps to be performed to retrieve data from the source computer system, to transform the retrieved data, and to store the transformed data in the destination computer system. At least some of the steps can be associated with executable code that, when executed, perform one or more tasks associated with the given step. In at least some embodiments, the automation migration manager 110 can be configured to generate source code for performing one or more of the identified steps based on data structures and/or data entity stored in the source computer system and/or the destination computer system.

In at least some embodiments, the migration modeler 120 can be configured to monitor the data migration activity 122 via an API of a data migration application configured to perform the data migration. For example, in an embodiment where the migration automation manager 110 is configured to perform the data migration by transmitting migration commands 112 to the observed computer system 130, the migration modeler 120 can be configured to receive the migration commands and/or migration data 116 from the migration automation manager 110 via an API of the migration automation manager 110.

In at least some embodiments, the generated program and/or generated source files can be modified by one or more users. Such modifications can be monitored by the migration modeler 120 and used as feedback to update the data migration model 124. Additionally or alternatively, the migration modeler 120 can be configured to monitor a subsequent data migration performed by the migration automation tool 110 using the generated program and to capture additional data migration activity (not shown) which can be used to update the data migration model 124. Thus, the migration observation and analysis performed by the migration modeler 120, and the migration program generation performed by the migration automation manager 110 can be repeated over the course of multiple data migrations involving different computer systems. Thus, the data migration model 124 can be iterative leave refined and the automation of subsequent data migrations can, in at least some cases, be progressively improved.

Figure 2:
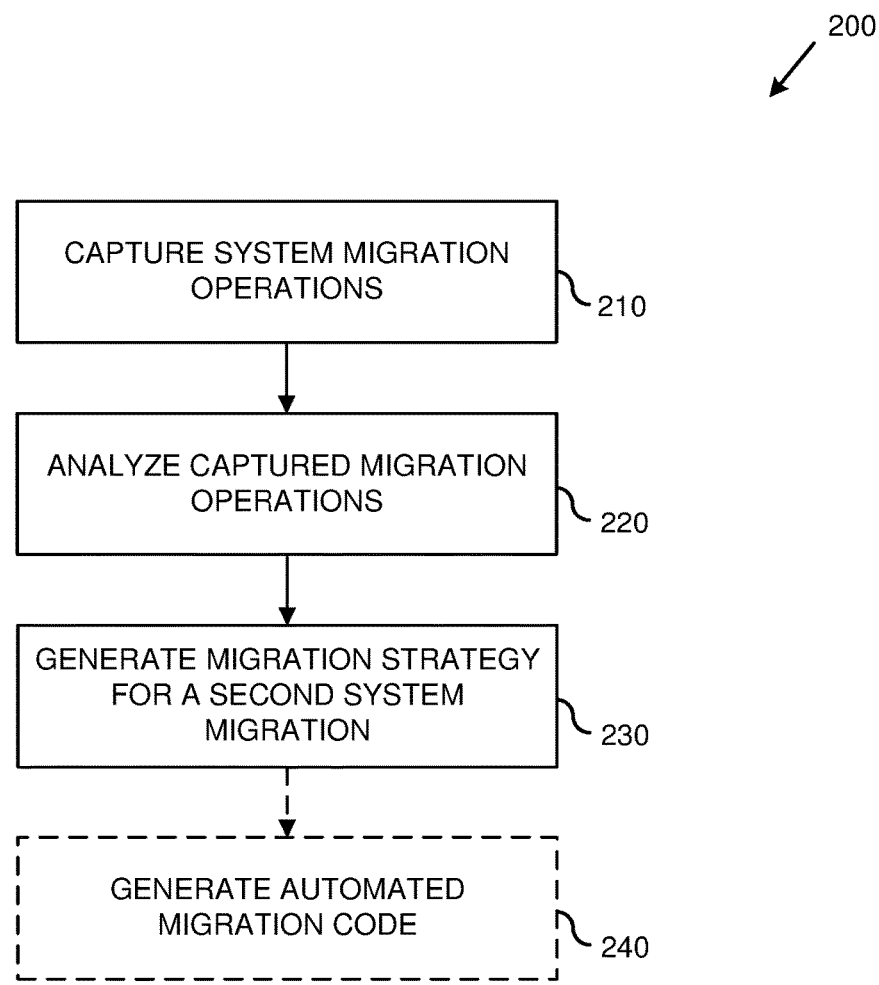
FIG. 2 is a flowchart of an example method for generating a migration strategy for a data migration using previously captured data migration operations.

FIG. 2 is a flowchart depicting an example method 200 for generating a migration strategy for a data migration using previously captured data migration operations. Any of the example systems described herein can be used to perform the example method 200.

At 210, system migration operations are captured. The system migration operations can be captured by monitoring activity of a source system and a destination system, while a data migration process is performed to migrate data from the source system to the destination system. For example, data transaction activity within a data base of the source system can be monitored to identify data extraction operations associated with the data migration. Data transaction activity within a data base of the destination system can be monitored to identify data loading operations associated with the data migration. Additionally or alternatively, system logs for the source system and/or the destination system can be monitored and entries that are written to one or more of the logs during the data migration can be retrieved. Additionally or alternatively, source code for one or more programs executed as part of the data migration can be retrieved from a source code repository. Such source code can include files written in one or more computer programming languages, interpreted data system scripts (such as Structured Query Language (SQL) scripts, Prolog scripts, or the like), etc.

At 220, the captured migration operations are analyzed and used to generate a data migration model. Generating the data migration model can comprise identifying data entities in the source computer system and identifying data entities in the destination computer system, using the captured data migration operations, and determining correlations between the identified data entities in the source computer system and the destination computer system.

In at least some embodiments, determining the correlations between data entities of the source computer system and data entities of the destination computer system can comprise mapping the source data entities to a known data model and mapping the destination data entities to the same data model. The mappings to the data model for the source and destination computer systems can then be used to determine associations and relationships between the source data entities and the destination data entities. Data retrieved from the source system for a given aspect of the data model can be compared to data associated with the given aspect of the data model that is written to the destination system. Data manipulation operations can be inferred for transforming the retrieved data into the data that is written to the destination system for the given aspect of the data model. Example aspects of the data model include logical system components and/or modules that are common to the source and destination system (such as user management, material management, inventory control, etc.) natural language processing techniques and semantic analysis can be used to parse data entity identifiers and to map the data entities to various aspects of the data model.

Additionally or alternatively, database activity, system log activity, and/or source code can be analyzed to identify functional entities (such as function store procedures, transactions, etc.) that can be used to extract data from the source system and to write the extracted data to the destination system. For example, it can be determined that a given functional entity is used to retrieve data items from the data entity of the source computer system and that another functional entity is used to write data items to a data entity of the destination computer system that is correlated with the source data entity in the data migration model. The identified functional entities can be identified as potential candidate entities for use in migrating data from the source data entity to the destination data entity and subsequent data migrations.

In at least some embodiments, system types can be determined for the source computer system and the destination computer system. The system type for a computer system can be an application name of the computer system, a vendor/manufacturer name for the computer system, and/or a version identifier for the computer system. The data migration module can be associated with the system types for the source computer system and the destination computer system. Such an association can indicate that the data migration model can be used to migrate data from other systems of the source system type to other systems of the destination system type.

At 230, a migration strategy is generated for a second system migration using the data migration model. In an embodiment where the data migration model is associated with the source system type and a destination system type, the data migration model can be selected for use in generating the migration strategy based on a determining that a second source computer system for the second system migration is associated with the source system type of the data migration model and that a second destination computer system for the second system migration is associated with the destination system type of the data migration model.

The migration strategy can be used to migrate data stored in the second source computer system to the second destination computer system. Generating the migration strategy can comprise analyzing the data migration model to locate source and destination data entities that exist in the second source computer system and the second destination computer system and generating a proposed sequence of operations for migrating data from the second source computer system to the second destination computer system based on the correlations defined in the data migration model.

Optionally, at 240, automated migration code is generated. The migration code can comprise executable instructions that, when executed by a processor, migrating at least part of the data stored in the second source computer system to the second destination computer system. For example, in embodiments where functional entities are associated with aspects of the data model in the migration data model, source code to extract data from associated data entities in the second source computer system using the identified functional entities can be generated. Additionally or alternatively, source code can be generated to transform and/or insert extracted data into the second destination system using the identified functional entities. In a particular example, source code can be generated to retrieve data from one or more data tables of the source computer system wherein the data comprises records comprising one or more data field values. Correlations between data table fields in the source computer system and data table fields in the destination computer system that are defined in the data migration model can be used to generate source code to store the extracted data in the destination computer system. In at least some such embodiments, source code can be generated to determine whether one or more tables exist in the destination computer system that are correlated with one or more tables in the source computer system in the data migration model. If the one or more tables do not exist in the destination computer system, the generated source code can include instructions for creating the missing tables.

In a different or further embodiment, generating the automated migration code can comprise modifying code for one or more previous data migrations. For example, it can be detected that the migration strategy is similar to a migration strategy of a previous data migration. Migration code for the previous data migration can be retrieved from a source code repository and used as a basis for the automated migration code. In a particular example, it is detected that one or more data entities of a source and/or target system are present in the migration strategy that are not present in the migration strategy for the previous data migration. The code for the previous migration can be extended to include code to migrate data to/from the missing data entities.

In at least some embodiments, the generated migration strategy and/or the migration code can be modified by one or more users. Such modifications can be detected and used to update the data migration model generated at 220. Additionally or alternatively, subsequent data migration operations for migration of data stored in the second source computer system to the second destination computer system can be captured and the data migration model can be updated based on the captured subsequent data migration operations. For example, differences between the generated migration strategy and the subsequent data migration can be determined and used as feedback to reinforce and/or discount aspects of the data migration model.

Example 3

Example Data Migration Models

In any of the examples described herein, a data migration model (also referred to as a "migration model") can comprise one or more data structures that describe learned relationships between data models of one or more source computer systems and data models of one or more destination computer systems. A data migration model can comprise one or more mapping records that define correlations between a data model of a source system and a data model of a destination system. In at least some embodiments, the data migration model can comprise one or more data structures generated by one or more artificial intelligence and/or machine learning algorithms, such as decision trees, sets generated by clustering algorithms, neural networks, naïve Bayesian classifiers, Bayesian networks, support vector machines, hidden Markov models, or the like.

In at least some embodiments, a data migration model can associate a data entity involved in a data migration with one or more candidate functional entities that may be used to extract data from the data entity (in the case of a source data entity) and/or insert extracted data into the data entity (in the case of a destination entity). Additionally or alternatively, the data migration model can associate data entities with executable code components (such as functions, methods, classes, etc.) that can be used to extract data from the data entities, transform the extracted data, and/or insert data into the data entities. Additionally or alternatively, the data migration model can comprise one or more models that represent a data flow of a data migration process.

Although the examples described herein may refer to a single data migration model, it is possible for multiple models to be generated and maintained using different types of collected data. For example, different models may be created based on analyzed data access operations, analyzed migration project source code, etc. In at least some cases, different artificial intelligence and/or machine learning algorithms can be used to generate the different models.

Example 4

Example Entities

In any of the examples described herein, an entity can be a construct defined in a database or data store. In at least some embodiments, an entity can be a construct defined for storing data in the database or data store. Such entities can be referred to as "data entities." Example data entities include database tables, database table columns, data fields, etc. In an embodiment comprising an object-oriented data store, example data entities can include object definitions. In an embodiment comprising a document store, example data entities can include document schemas and/or templates. In at least some embodiments, instances of a data entity can be stored in a database or data store where the data entity is defined. Example data entity instances include database table rows, database table row field values, objects, documents, etc. In at least some cases, data entity instances can be retrieved from the database or data store where one or more data entities are defined by providing a query to the database or data store, wherein the query comprises one or more data entity identifiers.

In at least some embodiments, an entity can be a functional construct stored in a database or data store. Such entities can be referred to as "functional entities." Example functional entities include user-defined functions, stored procedures, views, triggers, indexes, etc. In at least some embodiments, a functional entity can be accessed and/or invoked by providing a query to the database or data store where the functional entity is defined, wherein the query comprises an entity identifier associated with the functional entity.

In at least some embodiments, entities can be associated with access permissions. An entity access permission can identify one or more entities to which the access permission pertains, one or more operations that can be performed using the one or more entities (such as read operations, rate operations, delete operations, execute operations, etc.), and one or more database user identifiers (and/or database user group identifiers). Entity access permissions can be positive and/or negative. For example, a positive entity access permission can indicate that an identified database user (and/or identified database user group) is authorized to perform an identified operation using an identified entity. In another example, a negative entity access permission can indicate that an identified database user (and/or identified database user group) is not authorized to perform an identified operation using an identified entity.

Example 5

Example Migration Monitoring and Automation

In any of the examples described herein, a system can be provided for data migration monitoring and automation.

Figure 3:
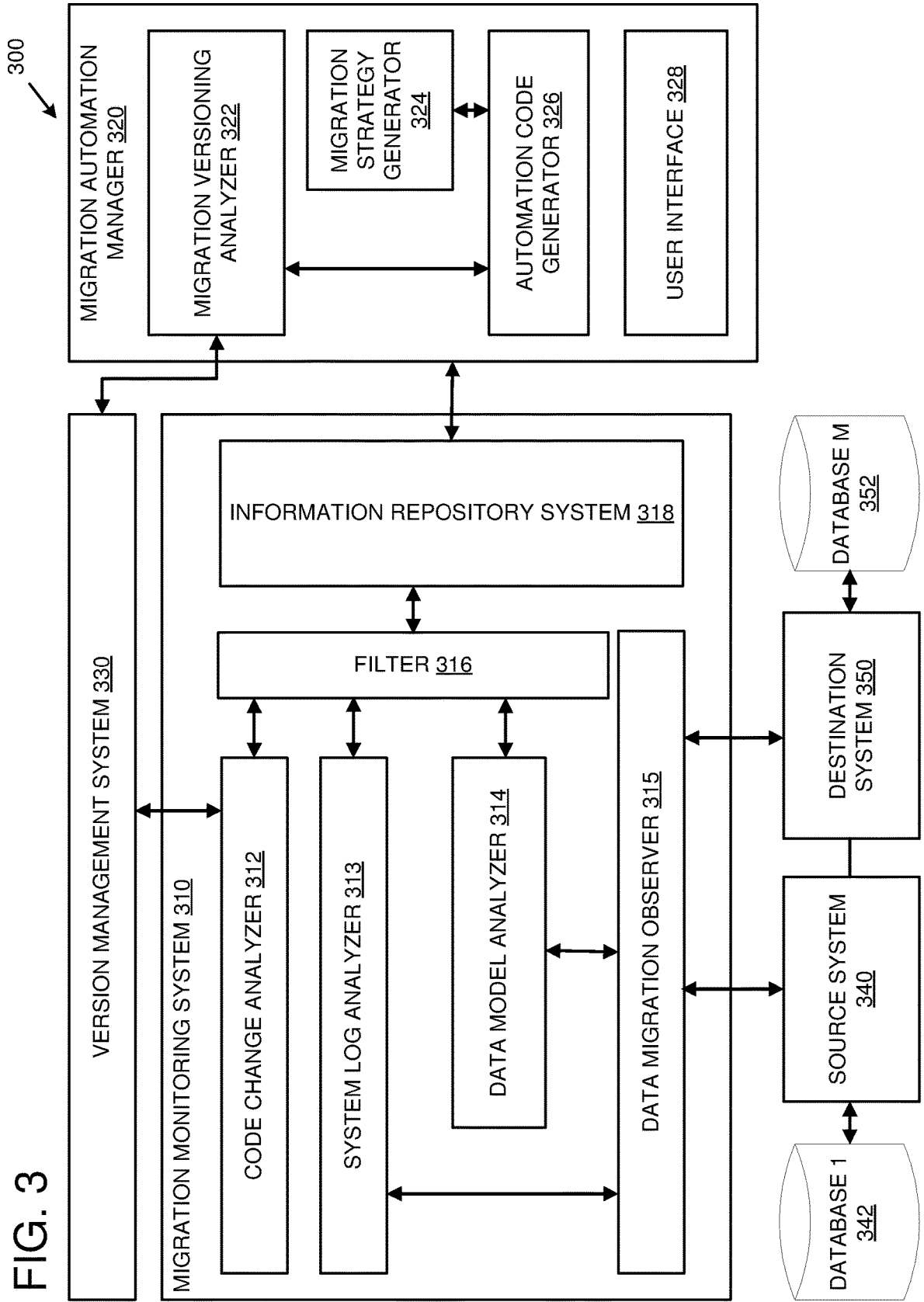
FIG. 3 is a system diagram depicting an example system for capturing data migration activity and using the captured activity to automate subsequent data migrations.

FIG. 3 is a system diagram depicting an example system 300 for capturing data migration activity and using the captured activity to automate subsequent data migrations. The example system 300 comprises a migration monitoring system 310, a migration automation manager 320, and a version management system 330. The migration monitoring system 310 is configured to monitor a data migration from a source system 340 to a destination system 350 and to analyze data migration activity. Migration monitoring system 310 is configured to retrieve source code files for programs executed as part of the data migration from the source system 340 to the destination system 350 from the version management system 330 and to analyze the retrieved source code files. Migration automation manager 320 is configured to retrieve the captured in correlated data migration information from the migration monitoring system 310 and use it to generate a migration strategy for use in performing a subsequent data migration from another source system to another destination system. In at least some embodiments, the migration automation manager 320 is configured to generate source code for use in automating all or part of the subsequent data migration. The migration automation manager 320 is configured to detect revisions to migration source code in the version management system 330 and to generate different migration strategies for different versions of source and destination computer systems associated with the different source code revisions.

The migration monitoring system 310 comprises a code change analyzer 312, the system log analyzer 313, a data model analyzer 314, a data migration observer 315, a unified filter 316, and an information repository system 318. The code change analyzer 312 can be configured to access the version management system 330 to retrieve source code files for the migration project that is executed to perform the data migration from the source system 340 to the destination system 350. Additionally or alternatively, the code change analyzer 312 can be configured to receive events fired by source code editor tools (such as an integrated development environment used by one or more users of the example system 300, a user interface 328 of the migration automation manager 320, etc.). Upon receipt of such an event, the code change analyzer 312 can be configured to retrieve a copy of one or more source code files that were affected by the received event. The retrieved one or more source code files can then be analyzed to determine relationships between data entities in the source system 340 and data entities in the destination system 350.

The data migration observer 315 can be configured to monitor a flow of data from the source system 340 to the destination system 350 during the data migration and to monitor system log activity for the source system 340 and the destination system 350 during the data migration. The data migration observer 315 is configured to record data access operations for the source system 340 and the destination system 350 and to provide the data access operations as input to the data model analyzer 314. The data migration observer 315 can be configured to provide recorded system log activity for the source system 340 and the destination system 350 to the system log analyzer 313.

The data model analyzer 314 can be configured to analyze the data migration operations received from the data migration observer 315 using natural language processing and one or more machine learning algorithms to learn a data model of the source system 340, to learn a data model of the destination system 350, and to recognize dependencies and relationships between the data models of the source system 340 and 350.

The system log analyzer 313 is configured to analyze the log activity received from the data migration observer 315 using natural language processing and machine learning to determine additional information regarding relationships between the source system 340 and the destination system 350. For example, the system log analyzer 313 can be configured to validate learned rules and/or algorithms for performing data migrations. In a particular example, the system log analysis can indicate whether or not an application of a learned migration algorithm results in one or more system errors or execute successfully. This in turn can be used as feedback to train the one or more machine learning algorithms used to recognize dependencies and relationships between the data models of the source system 340 and the destination system 350.

In at least some embodiments, the system log analyzer 313 can be configured to detect one or more warning messages in a log. The system log analyzer 313 can be configured to determine a source of one or more of the detected warning messages. For example, the system log analyzer 313 can be configured to analyze the contents of the warning message(s) (such as message type(s), message class(es), message number(s), message description(s), stack trace(s), etc.) to detect a class, component, service, or the like, from which the one or more warning messages origi- nated. In at least some cases, the system log analyzer 313 can determine that multiple warning messages originated from a same source during a given time span. In such cases, the system log analyzer 313 can group the warning messages together and treat the warning messages as representing a single anomaly during a data migration model generation process.

In a different or further embodiment, the system log analyzer 313 can be configured to transmit one or more detected warning messages (and/or information about a detected origin of the one or more warning messages) to a supervisor for review. The system log analyzer 313 can be configured to receive feedback from the supervisor indicating whether the detected one or more warnings represent a problem or can be ignored. The system log analyzer 313 can be configured to update a data migration model based on the feedback.

The unified filter 316 can be used by the code change analyzer 312, the system log analyzer 313, and/or the data model analyzer 314 to filter out non-relevant information received from the version management system 330 and/or the data migration observer 315. Non-relevant information can be information that is not pertinent to the migration of data from the source system 340 to the destination system 350. The filtered information can then be analyzed by the respective analyzation components 312-314 and stored in the information repository system 316. With respect to the code change analyzer 312, the unified filter 316 can be configured to filter out to filter out source code revisions that are subsequently removed in later versions of the migration project source code files.

The migration monitoring system 310 can be configured to generate a data migration model that identifies the dependencies relationships between the data models of the source system 340 and the destination system 350 and associated migration source code that can be used for extracting data from the source system 340 and writing the extracted data to the destination system 350. Based on the recorded data migration operations, the migration monitoring system 310 can be configured to determine a sequence of migration processes that were used to migrate the data from the source system 340 to destination system 350.

The migration automation manager 320 can be configured to retrieve the information stored in the information repository system 318 to generate a strategy for performing a subsequent data migration from another source system (not shown) to another destination system (not shown). The migration automation manager 320 comprises a migration versioning analyzer 322, and migration strategy generator 324, an automation code generator 326, and a user interface 328.

The migration strategy generator 324 can be configured to generate a migration strategy comprising a proposed sequence of operations for migrating data from a source system to a destination system. For example, the migration automation manager 320 can be configured to receive a request via the user interface 328 to generate a strategy for migrating data from an identified source system two and identify destination system. The migration strategy generator 324 can be configured to determine that the identified source system as a same system type as the source system 340 and that the identify destination system has a same system type as the destination system 350. The migration strategy generator 324 can retrieve the analysis information from the information system repository 316 related to the migration of data from the source system 340 to the destination system 350. The migration strategy generator 324 can use the retrieved and analysis information (including the generated data migration model) to generate the proposed sequence of operations for migrating data from the source system to the destination system.

The automation code generator 326 can be configured to generate one or more executable files associated with one or more of the proposed operations in the generated migration strategy. For example, the generated data migration model can be used to identify correlated data entities in the source and destination systems and data operations for migrating data between the correlated data entities. Additionally or alternatively, one or more source code files in the version management system 330 can be associated with the correlated data entities. In such an embodiment, the generated executable files can be based, at least in part on the identified source code. In at least some embodiments, generating the one or more executable files can comprise locating one or more code files for one or more previous data migrations, modifying and/or extending the code files, and generating the executable files based on the modified and/or extended code files.

The migration versioning analyzer 322 can be used to detect product version differences between the source system 340 and the destination system 350, and the identified source system in the identify destination system, respectively. In a scenario where different versions of migration project source files in the version management system 330 are associated with the different product versions, the migration versioning analyzer 322 can be configured to derive relevant changes from the version management system 330 and to adjust the generated migration strategy and/or generated automation code. For example, migration versioning analyzer 322 can detect that a newer version of a migration project exists that a version of the migration project that was used as part of the analysis of the migration of data from the source system 340 to the destination system 350. The migration versioning analyzer 322 can be configured to identify differences between the newer version of the migration project and the previous version of the migration project and to adjust the analysis information in the information repository system 316 based on the detected differences.

Figure 4:
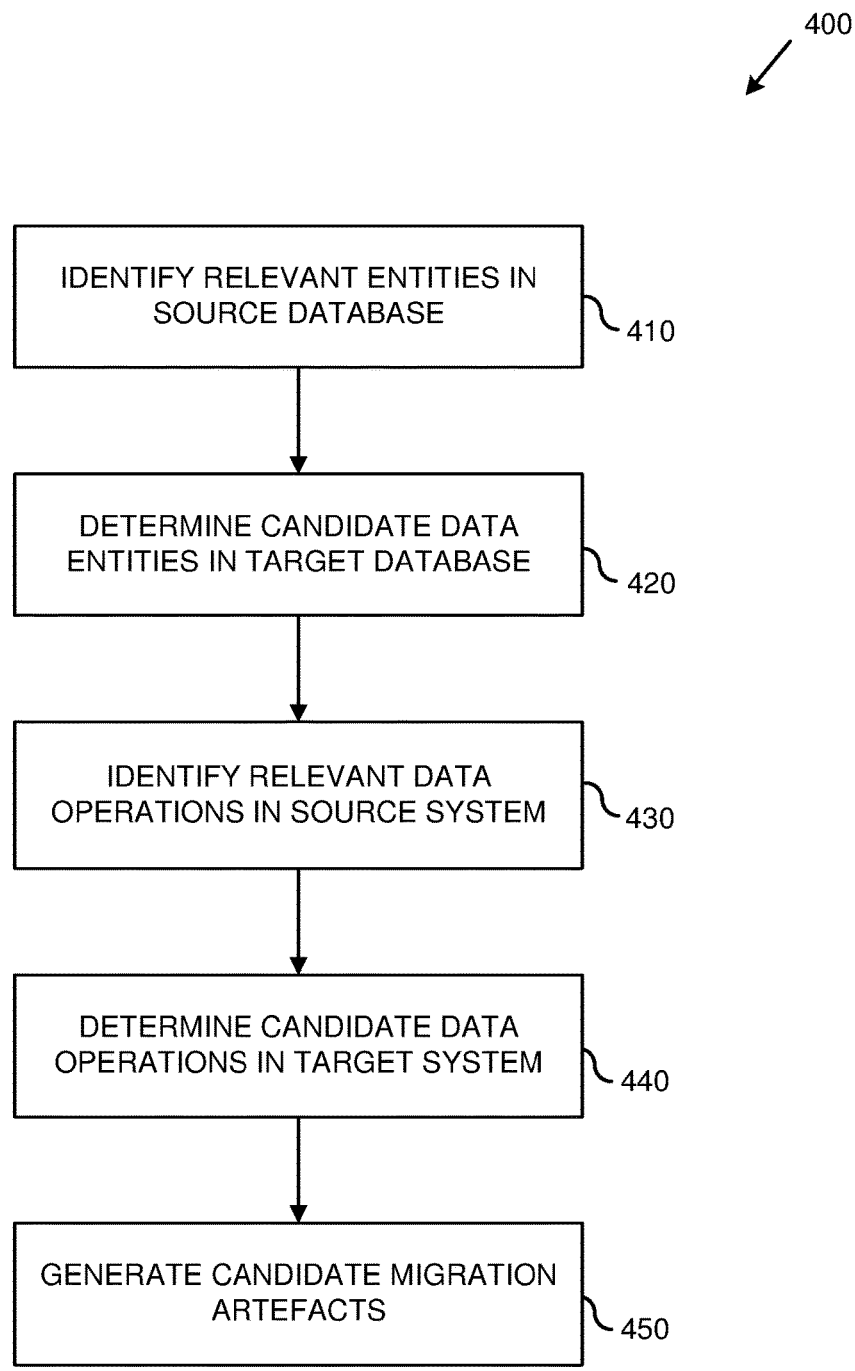
FIG. 4 is a flowchart of an example method for generating a data migration program using a data migration model.

FIG. 4 is a flowchart of an example method 400 for generating a data migration program using a data migration model. Any of the example systems described herein can be used to perform the example method 400.

At 410, entities in a source database that are relevant to a data migration to a target database are identified. The entities in the source database can be identified using the generated data migration model that comprises identifiers for source data entities relevant to a data migration from the source database to the target database. The source database can be searched for data entities having the identifiers defined in the data migration model. In at least some embodiments, the data migration model is selected using a system type associated with the source database and/or a version number associated with the source database.

At 420, candidate target entities in the target database are identified. The data migration model can comprise correlations between the identified source data entities and data entities in the target database. For example, the data might creation model can comprise mappings of source data entity fields to destination data entity fields. Additionally or alternatively, the data migration model can identify associations between source data entities and destination data entities and can link data extraction, data transformation, and/or data boating operations with the association between the source data entities and the destination data entities. In at least some embodiments, the data migration model comprises and abstracted data model comprising one or more logical system components and associations between data entities in the source system and the abstracted data model and associations between data entities in the destination system and the abstracted data model. The correlations between the source data entities and the target data entities can be used to determine data entities in the target database that are relevant to the migration of data from the source database to the target database.

At 430, data operations in the source system that are relevant to the data migration are identified. The data migration model can identify data operations that can be executed in a source system comprising the source database to extract data from the data entities in the source database. In at least some embodiments, the data migration model comprises associations between the identified data entities and particular data operations supported by the source system that can be used to extract data from the associated data entities. For each source data entity identified in the data migration model, relevant data operations for extracting data from the source data entity can be identified using such associations in the data migration model.

At 440, candidate data operations in a target system are determined. The data migration model can comprise associations between data entities in the target database and various data operations supported by the target system comprising the target database that can be used to store data in the target data entities. In at least some embodiments, the data migration model comprises associations between destination data entities and particular data operations supported by the target system that can be used to store data in the associated target data entities in the target database.

At 450, candidate migration artefacts are generated. The candidate migration artefacts can comprise a sequence of proposed data operations for migrating data from the source database to the target database. Additionally or alternatively, the migration artefacts can comprise executable code that is generated based on the correlations defined in the data migration model between the source and destination data entities. For example, code can be generated to perform one or more relevant data operations in the source system to extract data from one or more associated source data entities and to perform one or more candidate data operations in the destination system to store the extracted data in one or more target data entities. Other types of candidate migration artefacts include destination data entities (such as database tables, database table fields, database table constraints, stored procedures, views, etc.), source code files (such as class definitions, function definitions, etc.), source code templates, reports, etc.

Figure 5:
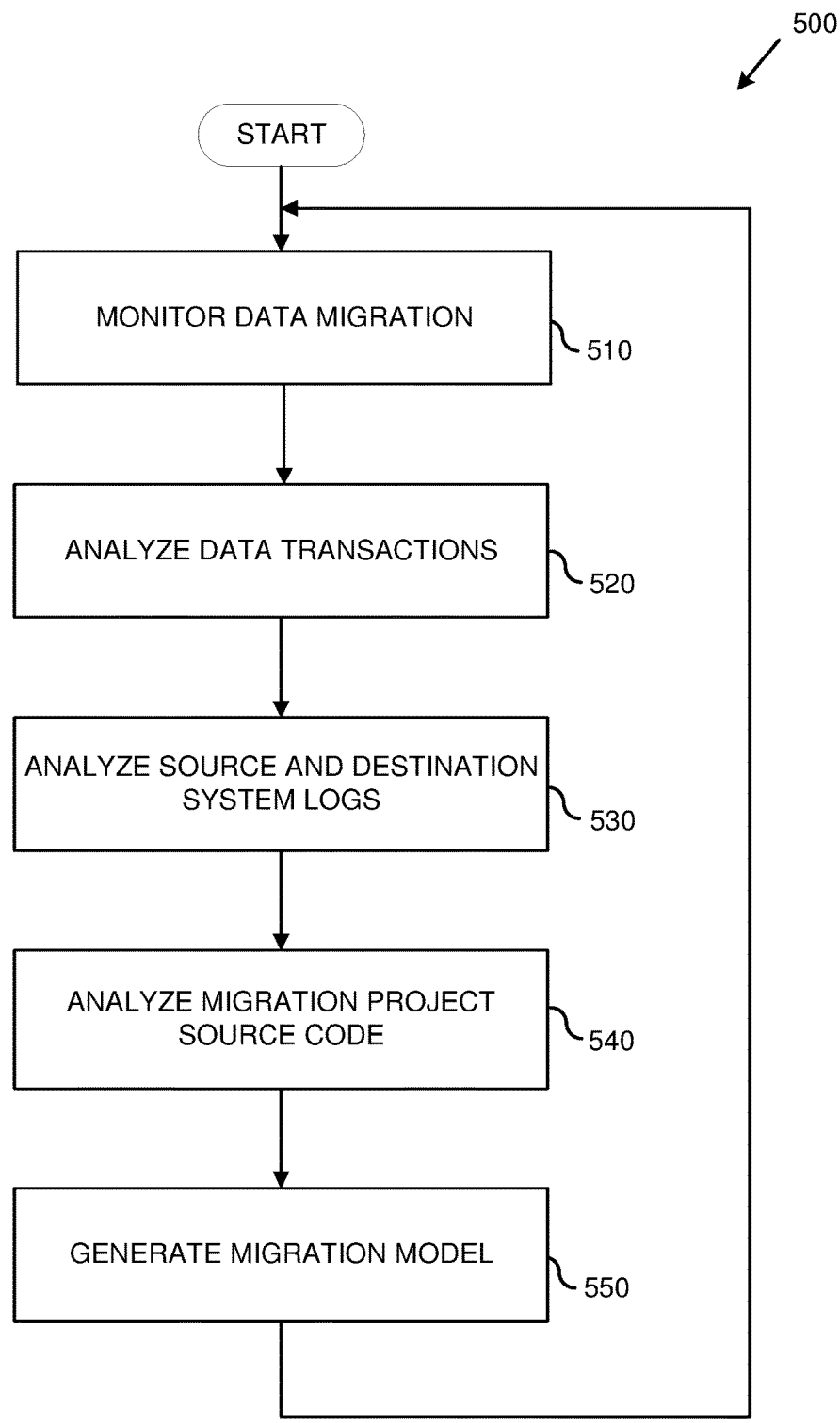
FIG. 5 is a flowchart of an example method for iteratively training a data migration model.

FIG. 5 is a flowchart of an example method 500 for iteratively training a data migration model. Any of the example systems described herein can be used to perform the example method 500.

At 510, a data migration from a source computer system to a target computer system is monitored. Monitoring the data migration can comprise observing data transactions performed against a source computer system and observing data transactions performed against a destination computer system during the migration of data from the source computer system to the target computer system. Monitoring the data migration can comprise observing system log entries that are written to system logs of the source computer system and that are written to system logs of the target computer system during the migration of data from the source computer system to the target computer system. Monitoring the data migration can comprise identifying one or more executable programs that are executed as part of the data migration, and retrieving source code for the one or more executable programs from a source controlled repository.

At 520, the detected data transactions are analyzed. Analyzing the data transactions can comprise identifying data entities in the source and destination computer systems that are involved in the data transactions additionally or alternatively, analyzing the data transactions can comprise identifying data entities in the source computer system that are associated with data entities and the destination computer system. For example, pattern recognition techniques can be used to identify a source data entity from which a given data item is extracted and a destination data entity to which the given data item is written. Additionally or alternatively, analyzing the data transactions can comprise identifying functional entities in the source and destination computer systems that are used to extract data from the source computer system and store data in the destination computer system.

At 530, the source and destination system logs are analyzed. Analyzing the source and destination system logs can comprise predicting correlations between entries in the source and destination system logs and data transactions performed in the source and destination systems. For example, in at least some embodiments, time stamps associated with log entries and data transactions can be used to identify correlations between data transactions performed in a computer system and subsequent log entries recorded in response to the performing of the data transactions. Log entries that are correlated with a given data transaction can be used to associate additional relevant information with the data transaction. For example, a given log entry may indicate that a particular data transaction failed or resulted in a warning.

At 540, the migration project source code is analyzed. Analyzing the migration project source code can comprise identifying code components (such as scripts, classes, methods, functions, etc.) associated with various data transactions. For example the migration project source code can comprise multiple components that, when executed cause the various data transactions detected during the data migration monitoring at 510 to be performed. In at least one embodiment, natural language processing can be used to identify various source code components that are responsible for executing various data transactions against the source and destination computer systems. Additionally or alternatively, time stamps associated with the detected data transactions can be used to create a proposed sequence for the execution of the source code components.

At 550, a migration model is generated. Generating the migration model can comprise using the data transaction analysis information in the system log analysis information to define correlations between data entities in the source computer system and data entities and the destination computer system. For example, the data item associations between the source data entities and the destination data entities can be used to define proposed mappings between source data entity fields and destination data entity fields. The system log analysis information can be used to verify the proposed mappings and/or to associate the proposed mappings with warning and/or error indicators. Generating the migration model can further comprise using the source code analysis information to associate the correlated source and destination data entities with source code components that can be used to extract data from the source data entities and/or write data to the destination data entities.

Subsequent to the generation of the migration model, the migration model can be used to generate a program for performing a data migration from another source system to another target system. 510-550 can be repeated for the subsequent data migration to further refine the migration model.

Example 6

Example Migration Project Version Analyzer

In any of the examples described herein, a system can be provided for analyzing migration project source code and source code version information.

Figure 6:
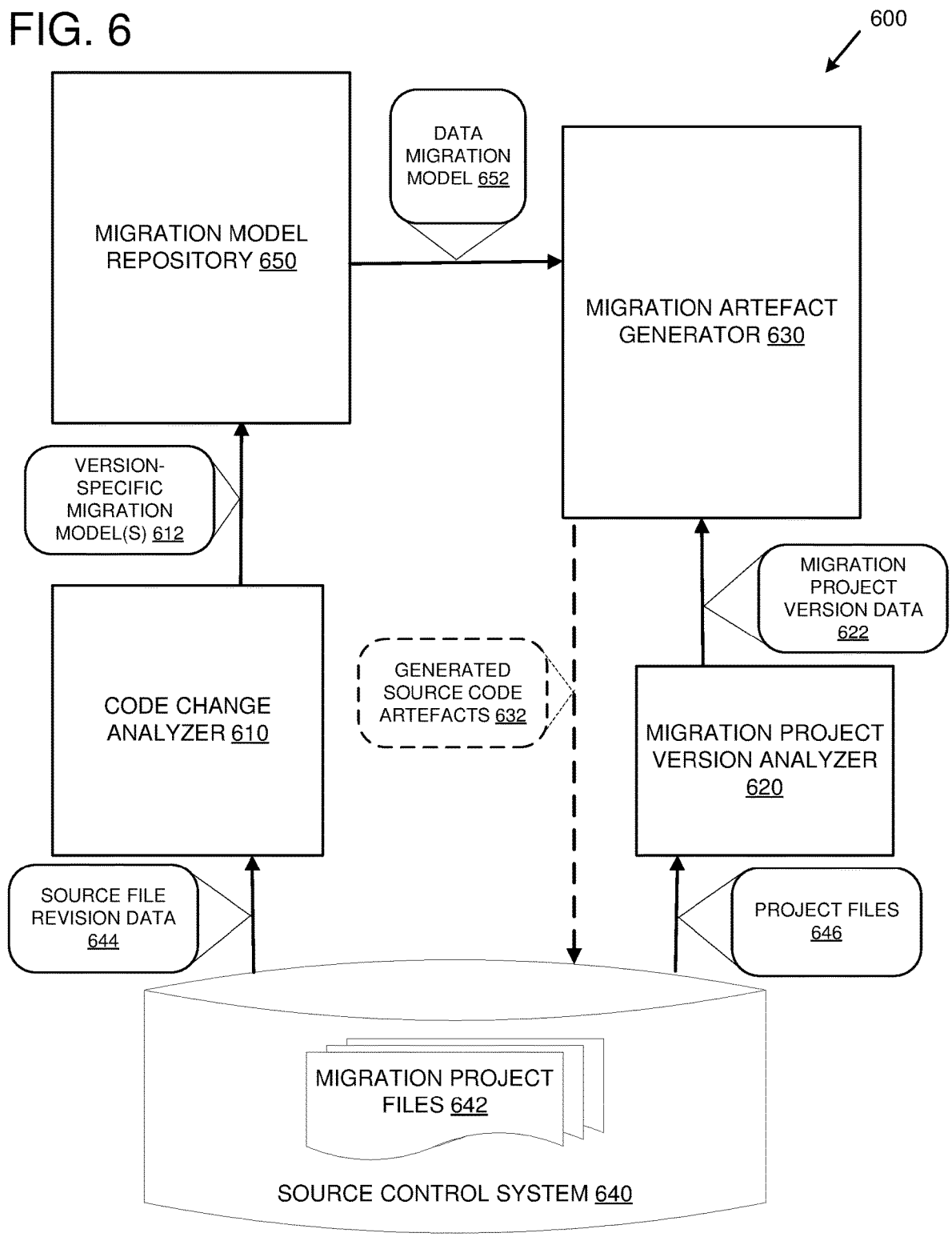
FIG. 6 is a system diagram depicting an example system for analyzing migration project files in a source control system.

FIG. 6 is a system diagram depicting an example system 600 for analyzing migration project files stored in a source control system 640. The example system 600 comprises a code change analyzer 610 configured to retrieve source for revision data 644 from a source control system 640. The source for revision data 644 can comprise revision information for one or more migration project source files 642 stored in the source control system 644. The revision information can describe changes between different versions of the migration project files 642 that have been committed to the source control system 640. The source code analyzer 610 can be configured to generate one or more version specific migration models 612 that are associated with the different versions of the migration project files described by the source file revision data 644. For example, the code change analyzer 610 can be configured to generate one data migration model that is associated with one version of the migration project files 642 and to generate another data migration model that is associated with a subsequent version of the migration project files that are described in the source file revision data 644. The code change analyzer can be configured to store the version specific migration models 612 and a migration model repository 650.

The example system 600 comprises a migration project version analyzer 620 that is configured to retrieve migration project files 646 from the source control system 640 and to identify migration project version data 622 associated with the retrieved project files 646. For example, the migration project version analyzer 620 can identify a version of the migration project files 642 that is relevant for a requested data migration from an identified source computer system to an identify destination computer system. Identifying the version of the project files that is relevant to the requested data migration can comprise determining a version of the identified source system, and/or a version of the identify destination system. The migration project version analyzer 620 can then identifier version of the migration project files 642 that are associated with the product version of the identified source system and/or the product version of the identify destination system. The migration project version data 622 can then be transmitted by a migration project version analyzer 622 the migration artefacts generator 630.

The migration artefacts generator 630 can be configured to retrieve a data migration model 652 from the migration model repository 650 that is associated with a version of the migration project files 642 that is identified in the migration project version data 622. The migration artefacts generator 630 can be configured to generate one or more data migration artefacts using the migration data model 652. The data migration artefacts can comprise one or more programs for migrating data from the identified source system to the identify destination system and/or one or more source code artefacts (such as source code files, database scripts, etc.)

that, when executed, perform one or more operations to migrate data from the identified source system to the identify destination system.

Optionally, the migration artefacts generator 630 can be configured to store the generated source code artefacts 632 and the source control system 640. In at least one embodiment, the generated source code artefacts 632 are stored as a new version of the migration project files 642. In a different or further embodiment, the generated source code artefacts can be subsequently modified by one or more users of the example system 600. The modified generated source code artefacts can be stored as subsequent versions of the generated source code artefacts 632 and the source control system 640. The code change analyzer 610 can be configured to detect changes to the source code artefacts a subsequent source file revision data for use in generating a subsequent version specific data migration model.

Figure 7:
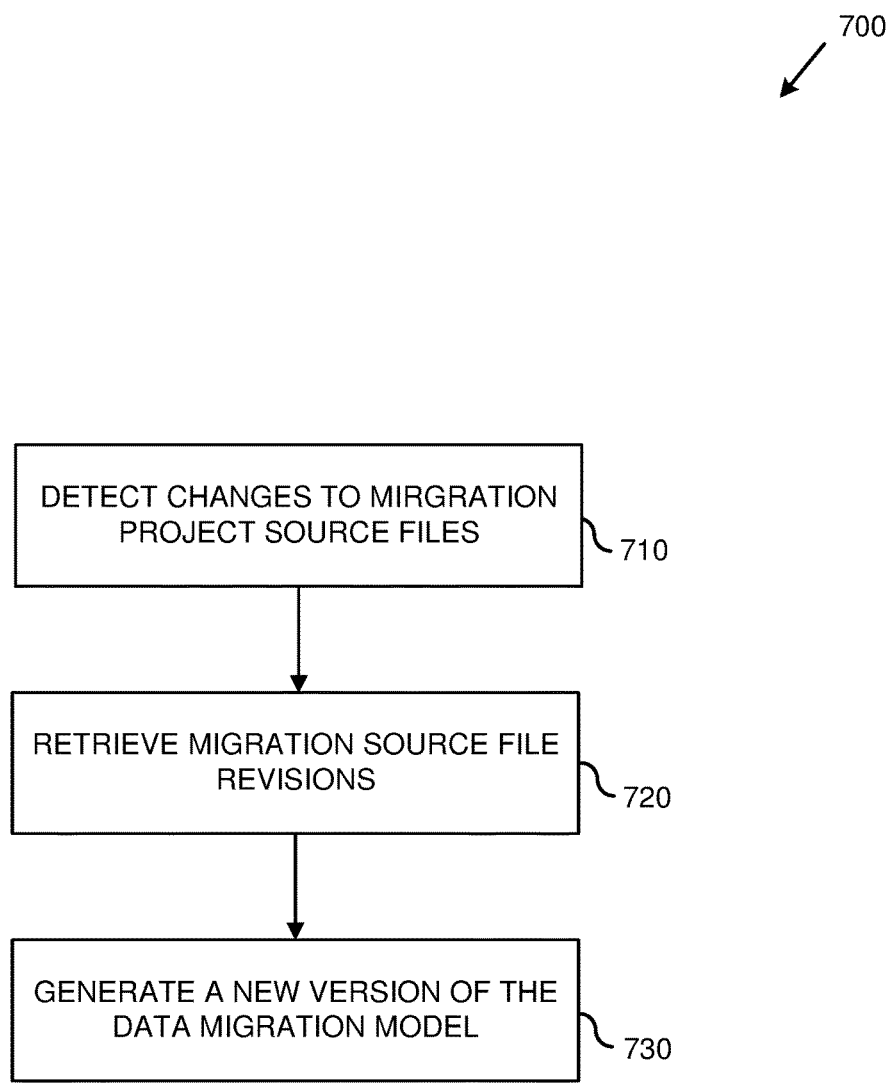
FIG. 7 is a flowchart of an example method for creating a new version of a data migration model based on detected migration source code revisions.

FIG. 7 is a flowchart of an example method 700 for creating a new version of a data migration model based on detected migration source code revisions. Any of the example systems described herein can be used to perform the example method 700.

At 710, changes to migration project source files are detected. Detecting the changes to the migration project source files can comprise using an API of a version control system or the migration project source files are stored to locate newly committed revisions to the migration project source files. Additionally or alternatively, the notification can be received from the version control system, indicating the changes to the migration project source files have been checked in. Additionally or alternatively, a file system change event can be received indicating that one or more of the migration project files have been saved to a file system. Other techniques for detecting changes to the source files are also possible.

At 720, migration source file revisions associated with the detected changes are retrieved from a version control system. The migration source file revisions can be retrieved from the version control system using an API of the of version control system. For example, the version control system can comprise an interface through which one or more manifests of source file revisions can be accessed and specific provisions can be retrieved.

At 730, a new version of the data migration model is generated using the detected revisions. The revisions can be analyzed to determine differences between a previous version of the source files associated with the data migration model and a more recent version of the source files comprising the detected changes. In at least some embodiments, the source file revisions comprise one or more files that identify the differences between the previous version of the source files and the more recent version. Alternatively, the previous version of the source files in the more recent version of the source files can be compared to one another to identify source code that has been added, removed and/or modified in the more recent version of the source files. The data model can be updated based on the detected differences. For example the detected differences may indicate that a source data entity should not be associated with a different destination data entity. Additionally or alternatively, the revisions may indicate that a different functional entity should be used to retrieve data from a source system and/or write data to a destination system. Additionally or alternatively, one or more source code procedures (or functions, etc.) associated with correlated source and destination data entities may have changed. The data migration model can be updated to reflect these changes.

Example 7

Example Data Model Analysis

In any of the examples described herein, a system can be provided for analyzing a data model of a computer system involved in a data migration.

Figure 8:
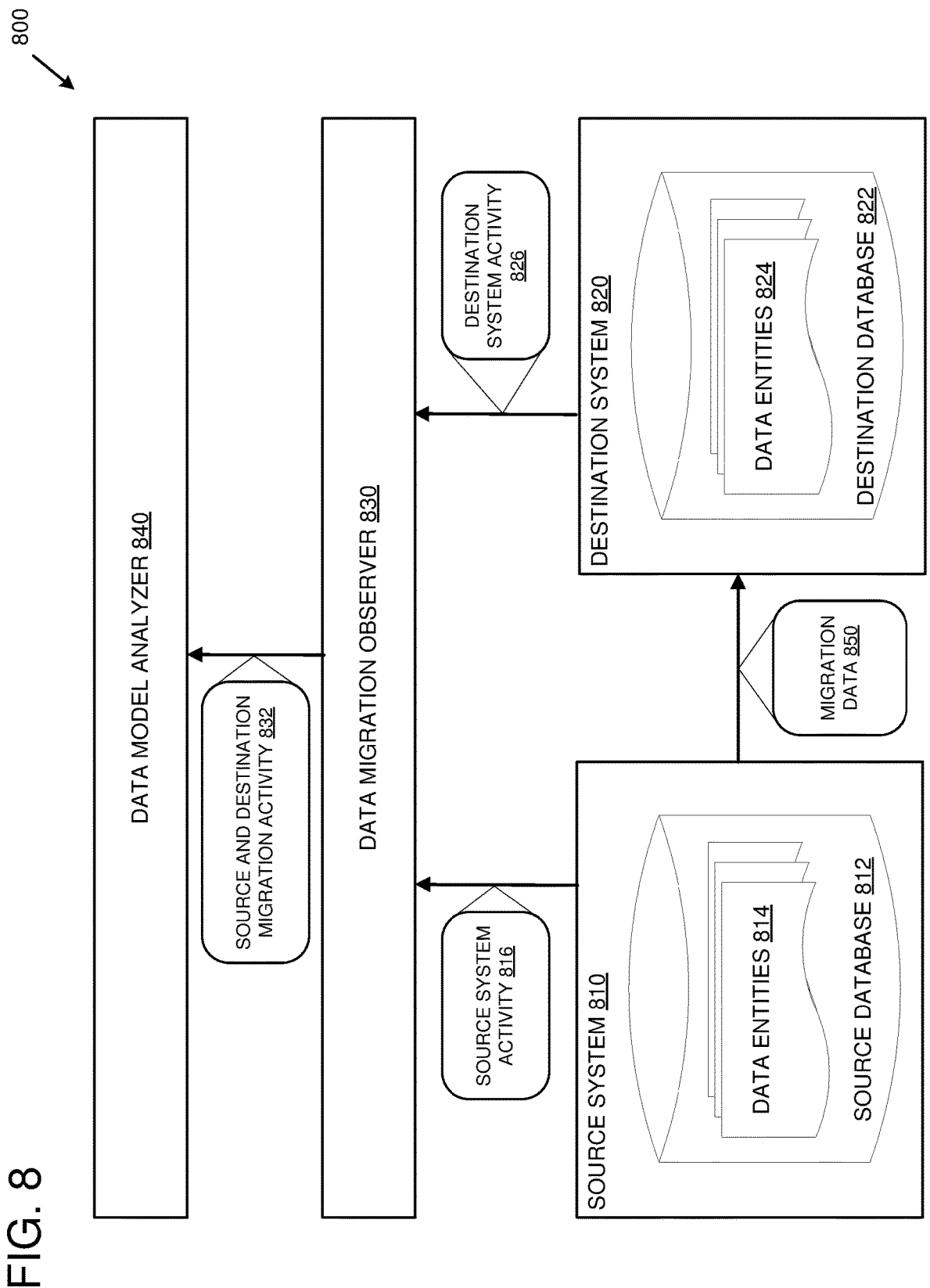
FIG. 8 is a system diagram depicting an example system comprising a data model analyzer and data migration observer.

FIG. 8 is a system diagram depicting an example system 800 comprising a data migration observer 830 and a data model analyzer 840. The data migration observer 830 is configured to receive source system activity 816 from a source system 810 and to receive destination system activity 826 from a destination system 820 while data 850 is migrated from the source system 810 to the destination system 820.

The source system activity 816 can comprise transactions targeting a source database 812 of the source system 810 that are executed during the data migration. Additionally or alternatively, the source system activity 816 can comprise data entities 814 and/or data entity fields that are retrieved from the source database 812 as part of the migration data 850. The destination system activity 826 can comprise transactions targeting a destination database 822 of the destination system 820. Additionally or alternatively, the destination system activity 826 can comprise data entities 824 and/or data entity fields written to the destination database 822 as part of the migration data 850.

The data model analyzer 840 can be configured to receive the source and destination migration activity 832 from the data migration observer 830. The data model analyzer 840 can be configured to determine relationships between the data entities 814 in the source database 812 and the data entities 824 in the destination database 822 using the migration activity 832. Pattern recognition techniques (such as machine learning and/or artificial intelligence algorithms) can be used to infer data models for the source system 810 and the destination system 820, and to predict correlations between the source system data model and the destination system data model. Analysis of transactions described in the migration activity 832 can be used to identify various procedures, functions, or the like that are used to extract data from a source data entity, transform the extracted data, and store the transform data in one or more correlated destination data entities.

Example 8

Example System Log Analysis

In any of the examples described herein, a system can be provided for analyzing log activity for a source computer system and a destination computer system during a data migration.

Figure 9:
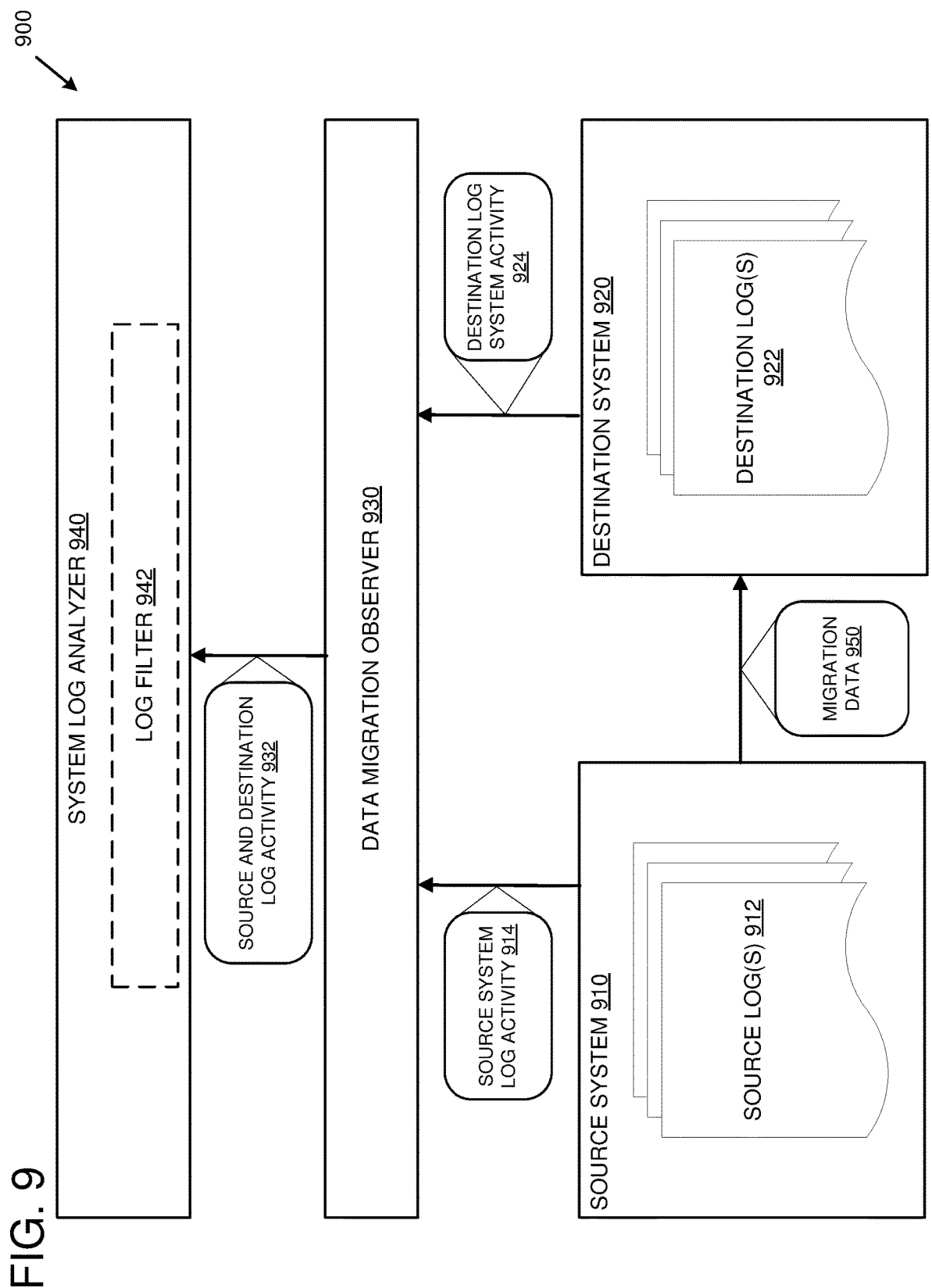
FIG. 9 is a system diagram of an example system comprising a system log analyzer and a data migration observer.

FIG. 9 is a system diagram of an example system 900 comprising a data migration observer 930 and a system log analyzer 940. The data migration observer 930 can be configured to receive source system log activity 914 from a source system 910 and to receive destination log system activity 924 from a destination system 920 while data 950 is migrated from the source system 910 to the destination system 920. The source system log activity 914 can comprise entries written to one or more source logs 912 during the data migration. The destination log system activity 924 can comprise entries written to one or more destination logs 922 during the data migration. The data migration observer 930 can be configured to receive the source log activity 914 and the destination log activity 924 by monitoring the source logs 912 in a file system of the source system 910 and monitoring the destination logs 922 in a file system of the destination system 920. Additionally or alternatively, the log activity 914 and 924 can be transmitted to the data migration observer 930 via one or more communication channels (such as via a centralized log management system or the like). The data migration observer 930 can be configured to transmit the source and destination log activity 932 to the system log analyzer 940.

The system log analyzer 940 can be configured to analyze the received log activity 932 and to determine correlations between data entities of the source system 910 and data entities of the destination system 920 based on the log activity. For example, log entries received from the source system logs 912 can identify executable components of the source system 910 that are used to extract data from data entities of the source system 910. Log entries received from the destination system logs 922 can potentially identify one or more executable components of the destination system 920 that are used to write the extracted data to data entities of the destination system 920. Such log activity can be used to create correlations between the source data entities and the destination data entities and to create associations between the correlated data entities in the executable components used to extract data from the source data entities and to store the extracted data in the destination data entities.

Additionally or alternatively, the system log analyzer 940 can be configured to use the system log activity 932 to verify correlations between source and destination data entities defined in a data migration model. For example, error log entries can be used to identify failed data operations to extract data from the source system 910 and/or to write data to the destination system 920. Correlations between source and destination data entities involved with the failed data operations can be identified in a data migration model used to perform the data migration between the source system 910 and the destination system 920. The failure information can be used as automatic feedback to train one or more machine learning and/or artificial intelligence algorithms that are used to generate the data migration model.

Optionally, the system log analyzer 940 can comprise a log filter 942 that identifies one or more source and/or destination system logs that should be omitted from the monitoring of system log activity. The system log analyzer can be configured to check log identifiers associated with the source and destination log activity 932 and to exclude activity associated with logs identified by the log filter 942 from analysis.

Example 9

Example Computing Systems

Figure 10:
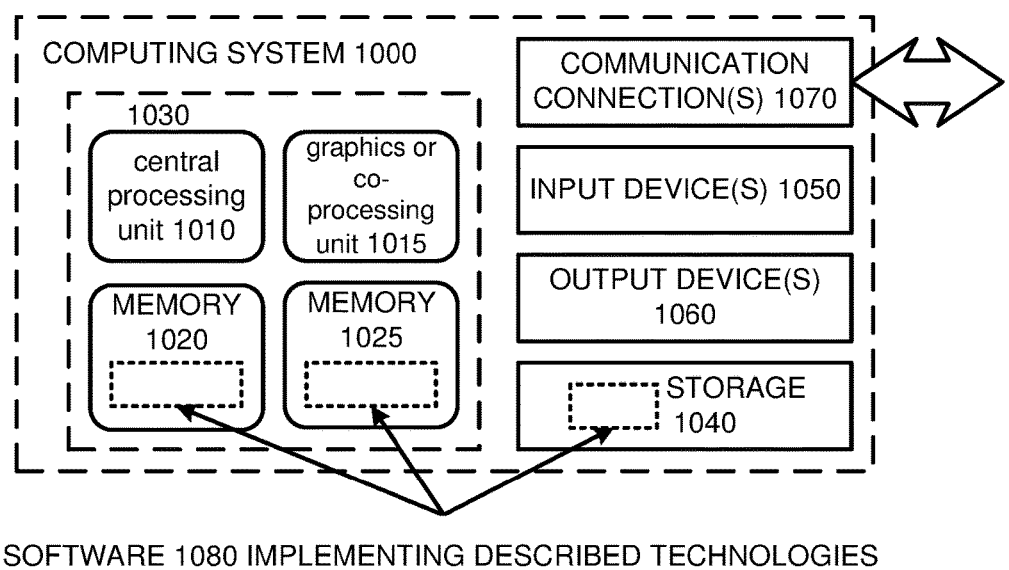
FIG. 10 is a block diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), nonvolatile memory (e.g., ROM, EEPROM, flash memory, solid state drives, etc.), or some combination of the two, accessible by the processing unit(s). The memory 1020, 1025 can store software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, solid state drives, CD-ROMs, DVDs, or any other medium which can be used to store information in a non-transitory way and which can be accessed within the computing system 1000. The storage 1040 can store instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10

Example Cloud Computing Environment

Figure 11:
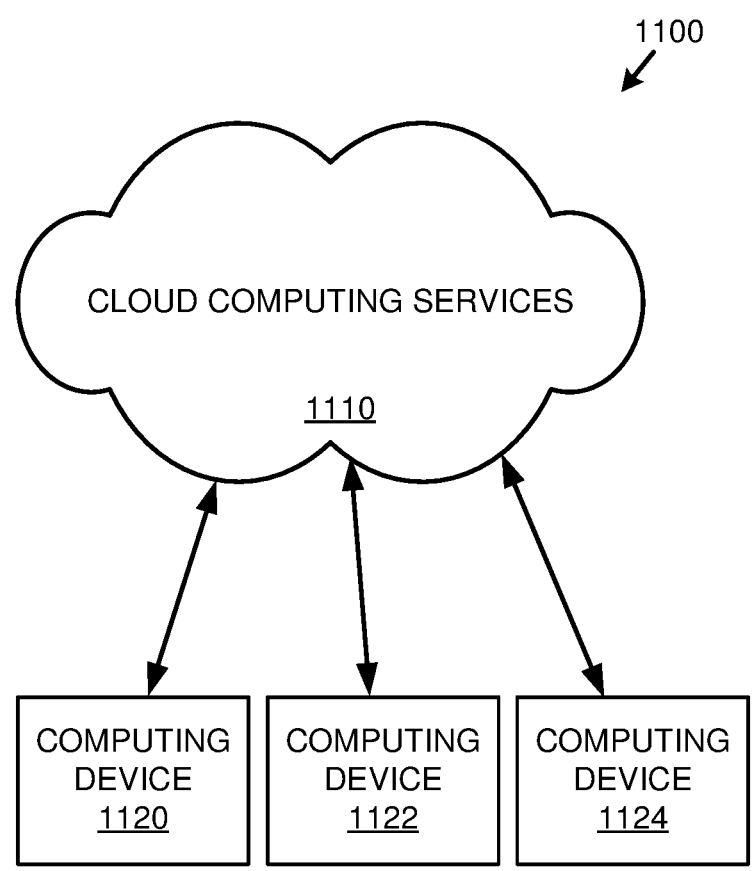
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 11

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or nonvolatile memory components (such as flash memory, solid state drives, or magnetic media such as hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A system, comprising:
a processor configured to:
receive a request associated with a transfer of data from a source system to a destination system,
determine, via execution of one or more machine learning models and a natural language processing model, a mapping between fields and tables of the source system and previously-identified fields and previously-identified tables of a known source data model;
predict, via machine learning model, a mapping between the mapped previously-identified fields and previously-identified tables of the known source data model and fields and tables of a destination data model of the destination system, wherein the known source data model and the destination data model have different naming conventions, the machine learning model identifies a correlation between the known source data model and the destination data model based on previous migration activity between a second source system and a second destination system identified from one or more system logs of the second source system and/or the second destination system, and the processor omits non-relevant information within the one or more systems logs from the previous migration activity, generate a sequence of operations for migrating data from the fields and tables of the source system associated with the request to the destination system based on the predicted mapping between the previously-identified fields and previously identified tables of the known source data model mapped to the fields and tables of the destination data model, and store the sequence of operations.

2. The system of claim 1, wherein the processor is further configured to generate source code for performing the sequence of operations to transfer data from the source system to the destination system.

3. The system of claim 1, wherein the processor is further configured to:
generate a migration program based on the generated sequence of operations.

4. The system of claim 1, wherein the processor is further configured to:
monitor additional data migration operations comprising a transfer of data from a second source system to a second destination system; and
generate a second version of the sequence of operations based on the subsequent data migration operations.

5. The system of claim 1, wherein the generated sequence of operations comprises operations to retrieve data from a field of a source table of the source data model of the source system and operations to write the retrieved data to the mapped field of the destination table of the destination data model of the destination system.

6. The system of claim 1, wherein the processor is further configured to:
identify a data table of the source system and a corresponding data table of the destination system that are associated with a same logical module; and
create an association between the identified data table of the source system and the identified data table in the destination system.

7. The system of claim 1, wherein the processor is further configured to:
detect revisions to one or more source code files in a source control system, wherein the one or more source code files cause one or more computing devices to perform data migration operations; and
generate a new version of the sequence of operations based on the detected revisions.

8. The system of claim 1, wherein the processor is configured to monitor data migration operations between the source system and the destination system via an application programming interface of a data migration application configured to perform the data migration operations.

9. A method, comprising:
receiving a request associated with a transfer of data from a source system to a destination system;
determining, via execution of one or more machine learning models and a natural language processing model, a mapping between fields and tables of the source system and previously-identified fields and previously-identified tables of a known source data model;
predicting, via a machine learning model, a mapping between the mapped previously-identified fields and previously-identified tables of the known source data model and fields and tables of a destination data model of the destination system,
wherein the known source data model and the destination data model have different naming conventions, the machine learning model identifies a correlation between the known source data model and the destination data model based on previous migration activity between a second source system and a second destination system identified by a processor from one or more system logs of the second source system and/or the second destination system, and the processor omits non-relevant information within the one or more systems logs from the previous migration activity;
generating a sequence of operations for migrating data from the fields and tables of the source system associated with the request to the destination system based on the predicted mapping between the previously-identified fields and previously identified tables of the known source data model mapped to the fields and tables of the destination data model; and
storing the sequence of operations.

10. The method of claim 9, further comprising:
generating source code for performing the sequence of operations to transfer data from the source system to the destination system.

11. The method of claim 9, further comprising:
generating a migration program based on the generated sequence of operations.

12. The method of claim 9, further comprising:
capturing subsequent data migration operations from a second source system to a second destination system; and
generating a second version of the sequence of operations based on the subsequent data migration operations.

13. The system of claim 9, wherein the generating comprises generating a sequence of operations comprising retrieving data from a field of a source table of the source data model of the source system and writing the retrieved data to the mapped field of the destination table of the destination data model of the destination system.

14. The method of claim 9, wherein the generating further comprises:
analyzing one or more system logs of the source system and/or the destination system; and
determining correlations between data tables of the source system and data tables of the destination system based on the analysis of the one or more system logs of the source system and/or the destination system.

15. The method of claim 9, wherein the generating further comprises:
analyzing source code for performing the transfer of data stored in the source system to the destination system; and
determining correlations between data tables of the source system and data tables of the destination system based on the analysis of the source code.

16. The method of claim 15, further comprising:
detecting a change to the source code in a source control system;
retrieving revision files from the source control system associated with the change to the source code; and generating a new version of the sequence of operations using the revision files.

17. The method of claim 9, further comprising:

determining a system type of the source system;

determining a system type of the destination system;

associating the sequence of operations with the system type of the source system and the system type of the destination system; and selecting the sequence of operations for use in generating a migration strategy between a second source system that is associated with the system type of the source system and a second destination system that is associated with the system type of the destination system.

18. A non-transitory computer-readable media storing instructions that, when executed by one or more processors, cause the one or more processors to perform a method comprising:

receiving a request associated with a transfer of data from a source system to a destination system;

determining, via execution of one or more machine learning models and a natural language processing model, a mapping between fields and tables of the source system and previously-identified fields and previously-identified tables of a known source data model;

predicting, via a machine learning model, a mapping between the mapped previously-identified fields and previously-identified tables of the known source data model and fields and tables of a destination model of the destination system, wherein the known source data model and the destination data model have different naming conventions, and the machine learning model identifies a correlation between the known source data model and the destination data model based on previous migration activity between a second source system and a second destination system identified by a processor from one or more system logs of the second source system and/or the second destination system, and the processor omits non-relevant information within the one or more systems logs from the previous migration activity;

generating a sequence of operations for migrating data from the fields and tables of the source system associated with the request to the destination system based on the predicted mapping between the previously-identified fields and previously identified tables of the known source data model mapped to the fields and tables of the destination data model; and storing the sequence of operations.

19. The system of claim 1, wherein the processor is configured to predict mappings between columns of source tables of the known source data model and columns of destination tables of the destination data model having different naming conventions via the machine learning.

* * * * *